(12) United States Patent
Davydov et al.

(10) Patent No.: US 9,300,509 B2
(45) Date of Patent: Mar. 29, 2016

(54) WIRELESS COMMUNICATION SYSTEM WITH COMMON CELL ID

(75) Inventors: Alexei Davydov, Nizhny Novgorod (RU); Alexander Maltsev, Nizhny Novgorod (RU); Yuan Zhu, Beijing (CN); Kamran Etemad, Potomac, MD (US); Yujian Zhang, Beijing (CN); Gregory V. Morozov, Nizhny Novgorod (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 13/995,175

(22) PCT Filed: Dec. 13, 2011

(86) PCT No.: PCT/US2011/064575
§ 371 (c)(1),
(2), (4) Date: Jun. 17, 2013

(87) PCT Pub. No.: WO2012/108928
PCT Pub. Date: Aug. 16, 2012

(65) Prior Publication Data
US 2013/0286997 A1    Oct. 31, 2013

Related U.S. Application Data

(60) Provisional application No. 61/439,987, filed on Feb. 7, 2011.

(51) Int. Cl.
*H04L 27/26* (2006.01)
*H04B 7/02* (2006.01)
(Continued)

(52) U.S. Cl.
CPC .............. *H04L 27/26* (2013.01); *H04B 7/024* (2013.01); *H04B 7/0456* (2013.01);
(Continued)

(58) Field of Classification Search
CPC ........ H04L 5/001; H04L 5/006; H04L 5/0023; H04L 5/0035; H04L 5/0053; H04L 5/0073; H04W 16/04; H04W 16/10; H04W 16/26; H04W 24/02; H04W 28/04; H04W 40/02; H04W 52/22; H04W 52/38; H04W 52/44; H04W 52/241; H04W 52/244; H04W 52/325; H04W 52/343; H04W 72/042; H04W 72/082; H04W 80/04; H04W 88/085
See application file for complete search history.

(56) References Cited

U.S. PATENT DOCUMENTS

2009/0041240 A1*  2/2009  Parkvall et al. ............... 380/247
2009/0268685 A1* 10/2009  Chen et al. .................... 370/329
(Continued)

FOREIGN PATENT DOCUMENTS

CN    101401339 A       4/2009
WO    2009/130199 A1   10/2009
(Continued)

OTHER PUBLICATIONS

CMCC, "Some considerations on CoMP deployment scenarios", 3GPP-RAN WG1 #63bis, R1-110426, See section 2, 2011, 2 pages.
(Continued)

*Primary Examiner* — Marsha D Banks Harold
*Assistant Examiner* — Dharmesh Patel
(74) *Attorney, Agent, or Firm* — Alpine Technology Law Group LLC

(57) ABSTRACT

Briefly, in accordance with one or more embodiments, a conventional physical downlink control channel (PDCCH) is transmitted in a first region of a physical downlink control channel structure utilized by a remote radio head that has been assigned a cell identifier that is common to one or more other remote radio heads within the cell, and an enhanced physical downlink control channel (ePDCCH) is transmitted in a second region of the physical downlink control channel structure.

12 Claims, 10 Drawing Sheets

(51) Int. Cl.

| | | |
|---|---|---|
| *H04B 7/04* | (2006.01) | |
| *H04B 7/06* | (2006.01) | |
| *H04L 1/06* | (2006.01) | |
| *H04W 56/00* | (2009.01) | |
| *H04W 72/04* | (2009.01) | |
| *H04W 24/02* | (2009.01) | |

(52) U.S. Cl.
CPC .............. *H04B 7/0619* (2013.01); *H04L 1/06* (2013.01); *H04W 24/02* (2013.01); *H04W 56/0045* (2013.01); *H04W 56/0085* (2013.01); *H04W 72/042* (2013.01)

(56) References Cited

U.S. PATENT DOCUMENTS

| | | | |
|---|---|---|---|
| 2010/0158256 A1* | 6/2010 | Sawahashi et al. ............ 380/287 |
| 2010/0323684 A1 | 12/2010 | Cai et al. | |
| 2011/0038310 A1* | 2/2011 | Chmiel et al. ................. 370/328 |
| 2011/0075624 A1* | 3/2011 | Papasakellariou et al. ... 370/329 |
| 2011/0096717 A1* | 4/2011 | Kim et al. ...................... 370/315 |
| 2011/0170496 A1* | 7/2011 | Fong et al. ..................... 370/329 |
| 2011/0199986 A1* | 8/2011 | Fong et al. ..................... 370/329 |
| 2011/0244877 A1* | 10/2011 | Farajidana et al. ......... 455/452.2 |
| 2011/0249633 A1* | 10/2011 | Hong et al. .................... 370/329 |
| 2011/0317656 A1* | 12/2011 | Rajih et al. .................... 370/330 |

FOREIGN PATENT DOCUMENTS

| | | | |
|---|---|---|---|
| WO | WO 2010053984 A2 * | 5/2010 |
| WO | WO 2011055986 A2 * | 5/2011 |
| WO | 2012/108928 A1 | 8/2012 |

OTHER PUBLICATIONS

Ericsson, "Baseline schemes and focus of CoMP studies", 3GPP TSG-RAN WG1 #63bis, R1-110461, see section 2, 2011, 2 pages.

MediaTek Inc., "Discussion on Rel-10 LTE Feature List and UE Capability from RAN1 Perspective", 3GPP TSG-RAN WG1 #63bis, R1-110145, See Section 2.3, 2011, 8 pages.

International Search Report and Written opinion for PCT Patent Application No. PCT/US2011/064575, mailed May 31, 2012, 11 Pages.

International Preliminary Report on Patentability and Written Opinion received for PCT Patent Application No. PCT/US2011/064575, mailed on Aug. 22, 2013, 7 pages.

Office Action and Search Report received for Chinese Patent Application No. 201180069926.0, mailed on Jul. 3, 2015, 25 pages including 16 pages of English translation.

Samsung, "PDCCH Extension for ICIC and Capacity Gains", document for discussion, May 10-14, 2010, 2 pages, 3GPP TSG Ram WG1, Montreal, Canada.

Ericsson, "Baseline Schemes and Focus of CoMP Studies", document for discussion, Jan. 17-21, 2011, 2 pages, 3GPP TSG-RAN WG1, Dublin, Ireland.

* cited by examiner

WIRELESS COMMUNICATION SYSTEM WITH COMMON CELL ID

CROSS-REFERENCE TO RELATED APPLICATIONS

The present application claims the benefit of U.S. Provisional Application No. 61/439,987 filed Feb. 7, 2011. Said Application No. 61/439,987 is hereby incorporated herein by reference in its entirety.

BACKGROUND

Distributed Antennas System (DAS) with a common Cell Identifier (ID) configuration is considered as one of the possible network deployment scenario in the Third Generation Partnership Project (3GPP) Long Term Evolution (LTE)-Advanced. In such a configuration, the distributed antennas of the macro-cell, referred to as Remote Radio Heads (RRHs), are distributed in different geographical locations throughout the cell and connected to the central control entity unit through high capacity, low latency backhaul link. A distributed antenna system (DAS) deployment with multiple RRHs may be configured to have the same Cell ID, and therefore such a DAS network has the potential to avoid many instances of handovers between transmission points. In addition, the set of RRHs serving specific user equipment (UE) may be adaptively formed according to the channel quality of the UE in order to facilitate efficient operation of the wireless communication system with common Cell ID.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 6A:
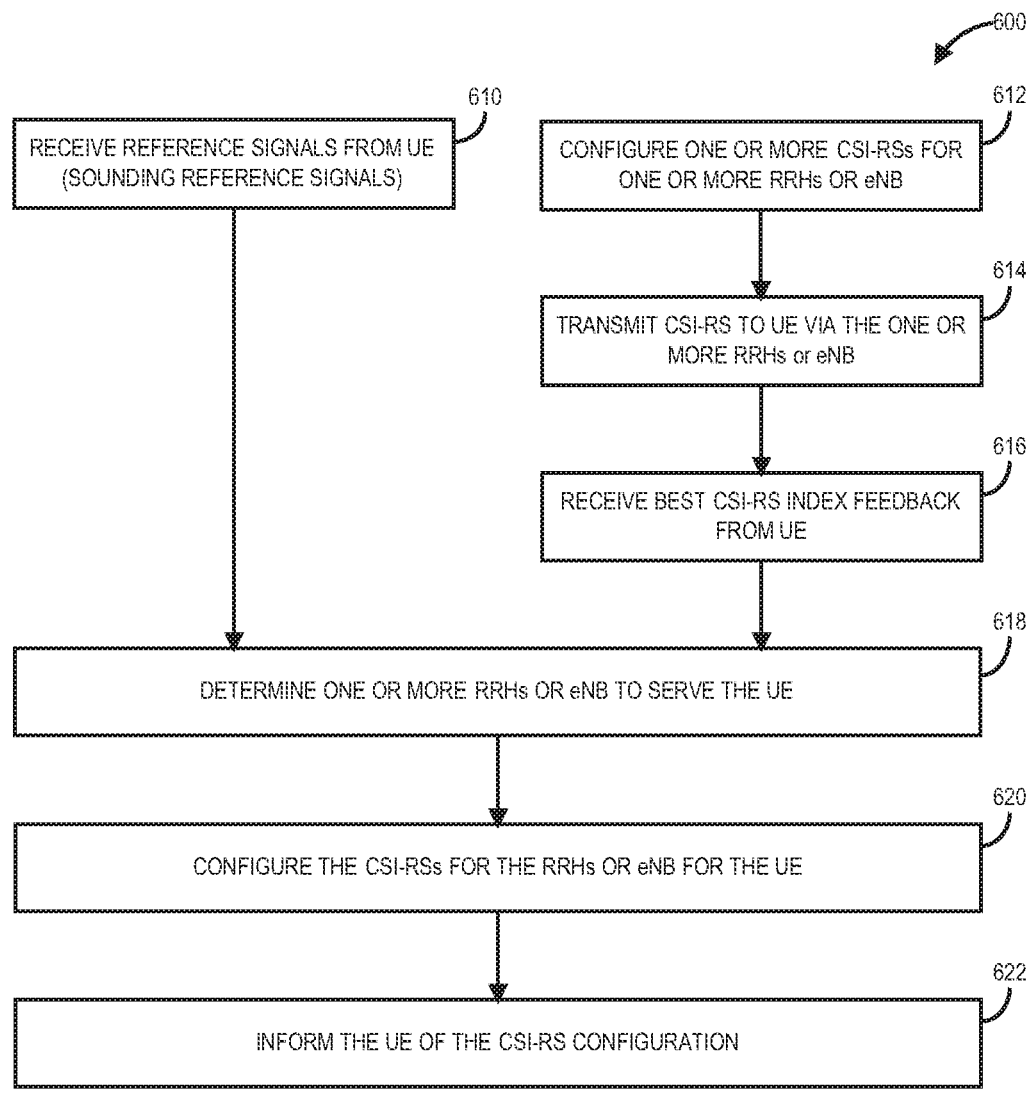
Figure 6B:
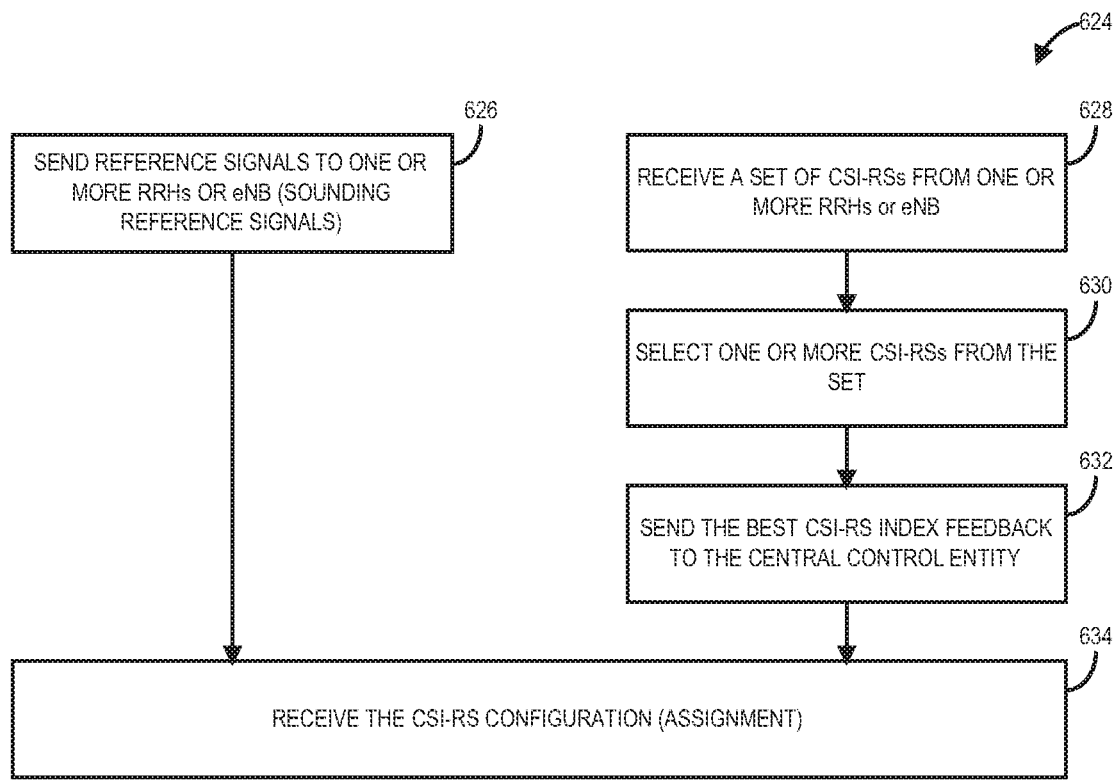
Figure 7:
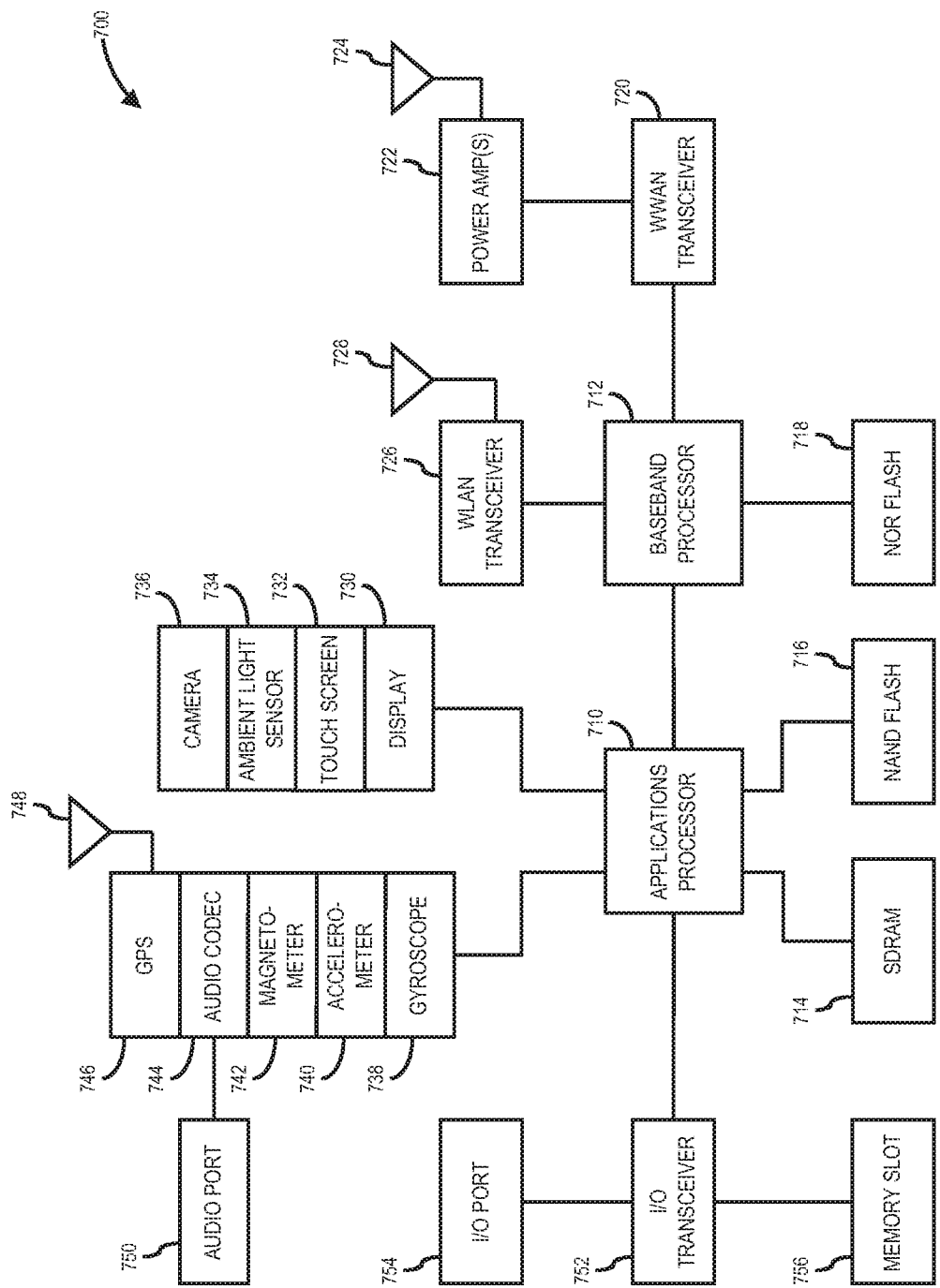
Figure 8:
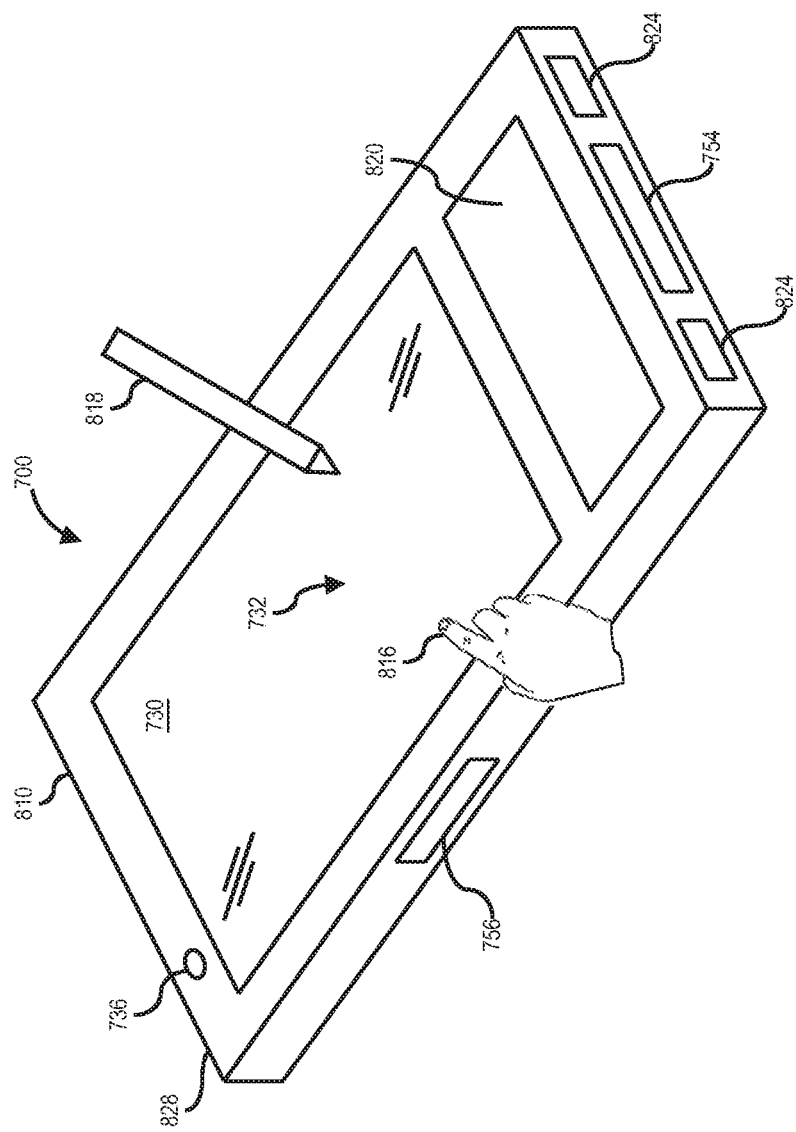

FIG. 6A, FIG. 6B, and FIG. 6B are flow diagrams of methods to configure channel state information reference signals and uplink power control in accordance with one or more embodiments;

FIG. 7 is a block diagram of an information handling system capable of implementing a wireless communication system with a common cell identifier in a broadband network in accordance with one or more embodiments; and FIG. 8 is an isometric view of an information handling system of FIG. 7 that optionally may include a touch screen in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
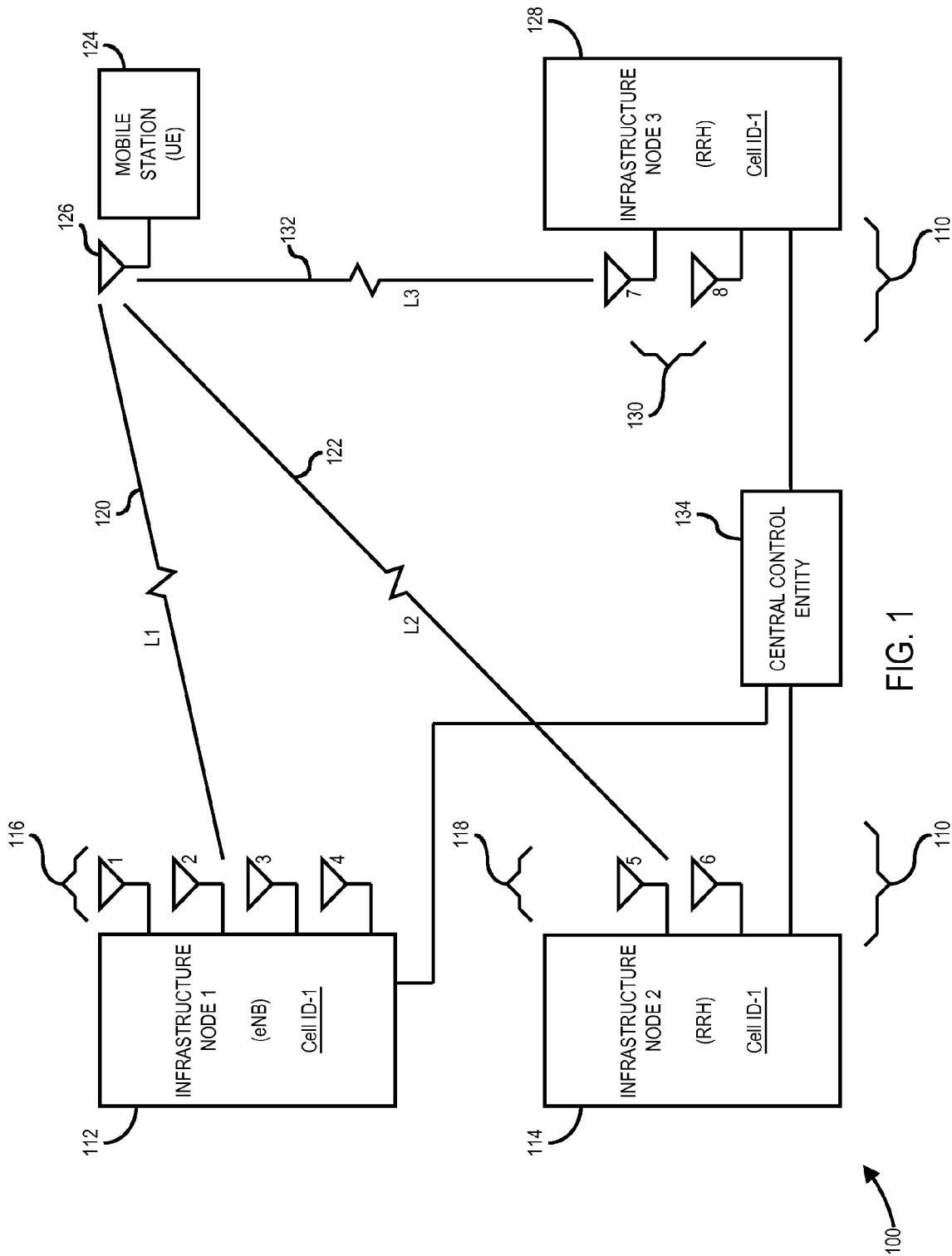
FIG. 1 is a diagram of a wireless communication system wherein the infrastructure nodes have a common cell identifier (ID) in accordance with one or more embodiments.

Referring now to FIG. 1, a diagram of a wireless communication system wherein the infrastructure nodes have a common cell identifier (ID) in accordance with one or more embodiments will be discussed. As shown in FIG. 1, wireless communication system 100 may comprise two or more infrastructure nodes such as infrastructure node 112, infrastructure node 114, and infrastructure node 128, that may all have a common cell identifier (ID), such as Cell ID-1, utilized for communication with a mobile station 124. Wireless communication system 100 may operate according to a Third Generation Partnership Project (3GPP) Universal Mobile Telecommunications System (UMTS) standard generally referred to as a Third Generation (3G) standard, or a Long Term Evolution (LTE)-Advanced standard generally referred to as a Fourth Generation (4G) standard, or the like. In one or more embodiments, wireless communication system 100 may operate according to an Institute of Electrical Engineers (IEEE) IEEE 802.16 standard such as IEEE 802.16e or IEEE 802.16m standard to implement a Worldwide Interoperability for Microwave Access (WiMAX) network or a WiMAX-II network, although the scope of the claimed subject matter is not limited in this respect. In such a network, infrastructure node 112 may comprise an evolved Node B (eNB), generally referred to as a base station, and infrastructure node 114 and infrastructure node 128 may comprise remote radio heads (RRHs) to receive and/or transmit data from/to one or more mobile stations 124 which may comprise user equipment (UE), although the scope of the claimed subject matter is not limited in this respect. The RRHs and eNB 112 may be connected to a central control entity 134 through a high capacity, low latency backhaul link. In some embodiments of wireless communication system 100, an eNodeB and one or more RRH infrastructure nodes may behave as a distributed antenna system (DAS) implementing multiple-input, multiple-output (MIMO) signal processing all having a common cell identifier (ID). For example, to implement MIMO communications in a DAS system 110, infrastructure node 112 may have a first set of antennas 116 (antennas 1 through 4), infrastructure node 114 may have a second set of antennas 118 (antennas 5 through 6), and infrastructure node 128 may have a third set of antennas 130 (antennas 7 through 8). The three sets of antennas transmit coordinated signals via a first transmission link (L1) 120, a second transmission link (L2) 122, and a third transmission link (L3) 122 to the antenna 126 of the mobile station 124. In some embodiments, the mobile station 124 may have a single antenna, and in other embodiments the mobile station 124 may have two or more antennas, and the scope of the claimed subject matter is not limited in this respect. In order to provide efficient operation of the wireless communication system 100 wherein the infrastructure nodes are assigned with a common cell ID, an advanced downlink control channel structure may be provided as shown in and described with respect to FIG. 3, below. An example of a cellular network having an eNB serving multiple sectors of multiple cells with multiple RRHs via such an advanced downlink control channel structure is shown in and described with respect to FIG. 2, below.

Figure 2:
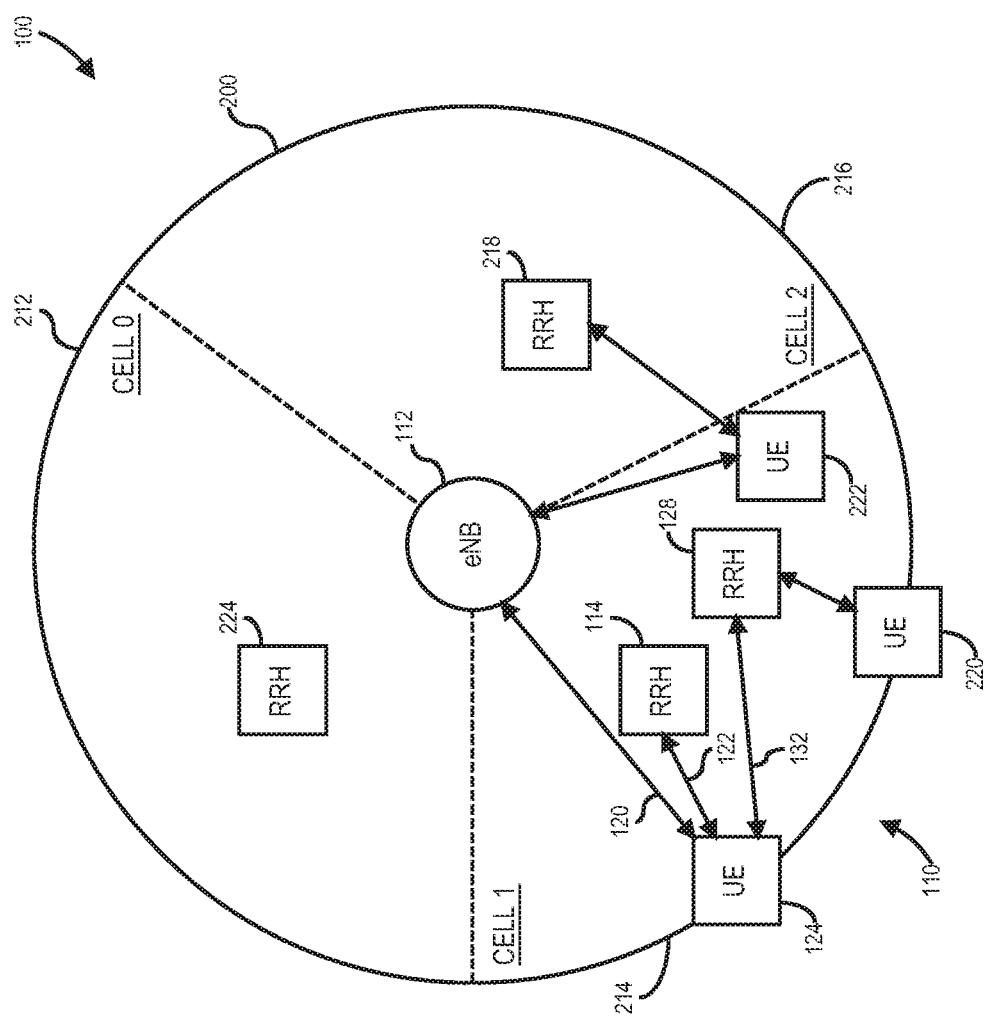
FIG. 2 is a diagram of an enhanced Node B (eNB) serving multiple sectors of multiple cells including multiple remote radio heads in accordance with one or more embodiments.

Referring now to FIG. 2, a diagram of an enhanced Node B (eNB) serving multiple sectors of multiple cells with multiple remote radio heads in accordance with one or more embodiments will be discussed. As shown in FIG. 2, wireless communication system 100 may include an enhanced Node B (eNB) infrastructure node 112 serving multiple sectors such as sector 212 or Cell 0, sector 214 or Cell 1, and sector 216 or Cell 2 of a cellular communication system. In generally, a cell cite may refer to three sectors collectively. In one or more embodiments, eNB infrastructure node 112 may be part of a Third Generation (3G) or Fourth Generation (4G) communication system in accordance with a Third Generation Partnership Project (3GPP) Long Term Evolution (LTE) or LTE-Advanced standard. Alternatively, in some embodiments eNB infrastructure node 112 may be part of an Institute of Electrical Engineers (IEEE) IEEE 802.16 standard such as IEEE 802.16e or IEEE 802.16m standard to implement a Worldwide Interoperability for Microwave Access (WiMAX) network or a WiMAX-II network, although the scope of the claimed subject matter is not limited in this respect. Although wireless communication system 100 may be discussed with respect to a given standard, the claimed subject matter is not limited to any particular standard, or release or version of that standard, and may encompass further versions or releases of those standards including standards not yet in existence but which may come into existence in the future.

In a given sector 214, eNB infrastructure node 112 may communicate in cooperation with one or more remote radio heads (RRHs), also known as a remote radio unit (RRU) or remote radio element (RRE), within a single sector, for example RRH infrastructure node 114 and RRH infrastructure node 128 deployed in sector 214 to communicate with mobile station UE 124 via links 120, 122, and 132 as shown in FIG. 2. The RRHs may include radio-frequency (RF) circuits to enhance the coverage, throughput and/or link quality of eNB infrastructure node 112. In such a communication system 100, one or more user equipment (UE) devices such as UE 124, UE 220 and/or UE 222 may communicate with eNB infrastructure node 112 and/or one or more of RRH 114 or RRH 128. In one or more embodiments, the infrastructure node eNB 112, infrastructure node RRH 114 and infrastructure node RRH 128 may all be assigned the same cell ID such as Cell ID-1 as shown in FIG. 1 in a distributed antenna system (DAS) 110. Such an arrangement of DAS 110 allows joint processing and beam forming across multiple cells by coordinating RRH infrastructure node RRH 114 and infrastructure node RRH 128 with a single infrastructure node eNB 112. The cells may be implemented via different antenna orientations of the eNB infrastructure node 112 to serve different sectors of the same cell site where eNB 112 is located, or alternatively the cells may be implemented via one or more remote radio heads such as RRH 114 and RRH 128 to provide local coverage within a given sector 214. It should be noted that the remote radio head (RRH) infrastructure nodes may be located within one or more sectors of the eNB coverage area 200, such as RRH 224 located in sector 212 and/or RRH 218 located in sector 216, and the scope of the claimed subject matter is not limited in this respect. For example, eNB infrastructure node 112 and RRH infrastructure node 226 located in sector 218 may cooperate to serve UE 222. Using one or more RRH infrastructure nodes in addition to eNB infrastructure node 112 may be referred to a distributed antenna system (DAS) 110 deployment as shown in and described with respect to FIG. 1. In one or more embodiments, the infrastructure nodes such as eNB 112, RRH 114, and RRH 128 may have the same cell ID wherein an advanced downlink control channel structure may be provided as shown in and described with respect to FIG. 3, below.

Figure 3:
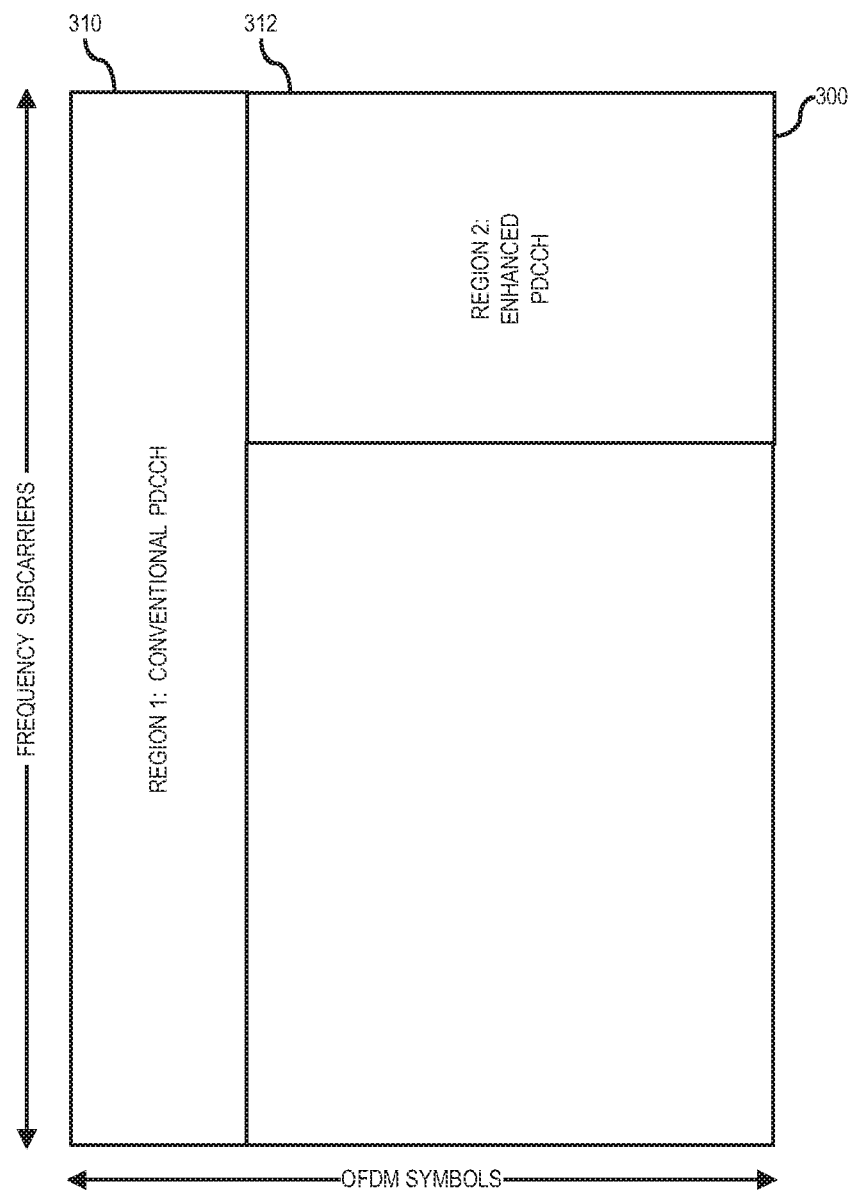
FIG. 3 is a diagram of a downlink control channel structure within a downlink subframe in accordance with one or more embodiments.

Referring now to FIG. 3, a diagram of a downlink control channel structure within a downlink subframe in accordance with one or more embodiments will be discussed. The downlink control channel structure of FIG. 3 may be utilized in a Distributed Antenna System (DAS) such as the communication system 100 of FIG. 1 and FIG. 2. Distributed Antennas Systems with a common Cell ID configuration is considered as one of the possible network deployment scenario in the 3GPP LTE-Advanced standard and beyond. In such configurations, the distributed antennas embodied in the remote radio units (RRUs) or remote radio heads (RRHs), such as the RRH infrastructure node 114 or RRH infrastructure node 128 of FIG. 1 and FIG. 2, in a macrocell are distributed in different geographical locations throughout the cell and connected to a central control entity unit through a high capacity, low latency backhaul link. A DAS deployment with multiple RRHs may be configured to have the same Cell ID and therefore potentially may avoid many instances of handovers between transmission points. For example, the RRH infrastructure node 114 and the RRH infrastructure node 128 may have the same Cell ID such as Cell ID-1. Additionally, the set of RRHs serving a specific mobile station 124 or user equipment (UE) may be adaptively formed according to the channel quality of the mobile station. In order to facilitate efficient operation of a wireless communication system with a common cell ID the following enhancements may be implemented.

As shown in FIG. 3, for backwards compatibility purposes the conventional physical control channel (PDCCH for LTE Releases 8, 9, 10) is transmitted in region (Region 1) 310 by all of the RRH infrastructure nodes in a joint transmission mode wherein the same signal is transmitted by all of the RRH infrastructure nodes. The same scrambling code is used by all of the RRH infrastructure nodes to modulate cell-specific reference signals. Conventional single-user open-loop MIMO (transmit diversity) schemes are applied in region 310. In region (Region 2) 312, the enhanced physical downlink control channel (ePDCCH) is transmitted. Region 312 may be localized or distributed in the frequency domain. The frequency location and the number of allocated physical resource blocks (PRBs) for ePDCCH region 312 are semi-statically configured and signaled via higher layers. The ePDCCH region 312 allocation in the subframe is defined by using conventional resource allocation schemes. In one or more embodiments, the ePDCCH region n (Region 2) 312 may be allocated using conventional mechanisms for allocation of a data payload, although the scope of the claimed subject matter is not limited in this respect.

In one or more embodiments, the ePDCCH may be transmitted in joint or simultaneous transmission modes. In the simultaneous transmission mode, each of the RRH infrastructure nodes transmits its own control channel on the common (the same) resources. The channel coding and modulation may follow a conventional design, but to enhance the performance of the control channel, advanced MIMO schemes such as open-loop MIMO with precoding cycling, closed-loop single-user or closed loop multi-user MIMO may be applied for multiple antenna transmission. To assist channel estimation in such MIMO schemes, Demodulation Reference Signals (DRS) or Common Reference Signals (CRS) as defined in a Long Term Evolution (LTE) standard, may be transmitted within ePDCCH region 312. The demodulation reference signals are spatially pre-coded (beamformed) in the same way as control signals are spatially pre-coded. In addition the demodulation reference signals are modulated by using RRH-specific or user-specific scrambling sequences to randomize the interference between the RRH infrastructure nodes on control channels which are transmitted in simultaneous mode. In one or more embodiments, the specific scrambling sequences may comprise Demodulation Reference Signals (DMRS) which are cell-specific, although the scope of the claimed subject matter is not limited in this respect.

In one or more embodiments, for backwards compatibility purposes the conventional downlink Physical Hybrid ARQ Indicator Channel (PHICH) is transmitted in region (Region 1) 310 by all the RRH infrastructure nodes in a joint transmission mode wherein the same signal is transmitted by all of the RRH infrastructure nodes, wherein ARQ refers to automatic repeat request. The same scrambling code is used by all of the RRH infrastructure nodes to modulate PHICH. Conventional single-user open-loop MIMO (transmit diversity) schemes may be applied.

The enhanced PHICH may be transmitted in region (Region 2) 312. The channel coding, modulation and orthogonal code spreading for PHICH payload follows a conventional design. To enhance the performance, advanced MIMO schemes such as open-loop single user MIMO with pre-coding cycling may be applied to enhanced PHICH for multiple antenna transmission. For enhanced interference averaging, the PHICH channels may be scrambled with RRH-specific or UE specific sequences.

For channel state information (CSI) measurements, multiple channel state information reference signals (CSI-RS patterns) may be transmitted by the distributed antenna system with a common cell ID. Conventionally, the CSI-RS signals are cell specific. However, in one or more embodiments, where the multiple RRH infrastructure nodes are assigned a common cell ID, each of the RRH infrastructure nodes may transmit its own unique CSI-RS pattern rather than a pattern that is common to the cell. In such embodiments, the particular CSI-RS patterns that are utilized for channel measurements and feedback report may be independently configured by a central control entity for the respective UEs. The configuration of CSI-RS may be decided at the central control entity based on sounding reference signal transmission from the UE or "best CSI-RS pattern index" explicit feedback from the UE.

For uplink power control schemes, the UE may be configured by the central control entity to operate with the specific RRH infrastructure nodes in the uplink and/or in the downlink. In this case, the uplink transmit power may be calculated by the UE from a conventional open loop power control equation, however the UE may be instructed by the central control entity to calculate the path loss parameter from CSI-RS measurements of the particular RRHs instead of CRS measurements as in the conventional power control scheme.

The enhanced downlink control channel structure 300 as shown in FIG. 3 allows reusing the downlink control channel resources among multiple RRH infrastructure nodes, and further allows usage of advanced MIMO schemes such as open-loop MIMO with pre-coding cycling, closed-loop single-user or closed loop multi-user MIMO. The CSI-RS configuration may be RRH-specific or user-specific and therefore may support closed-loop MIMO schemes with RRHs adaptive set selection. The uplink open-loop power control scheme may be based on path loss measurements from CSI-RS which may be more optimal than measurements on CRS for uplink transmission schemes with RRHs adaptive set selection. The enhanced downlink control channel structure 300 allows for RRH-specific or user-specific CSI-RS configuration, and uplink open-loop power control schemes may be based on CSI-RS measurements.

Figure 4:
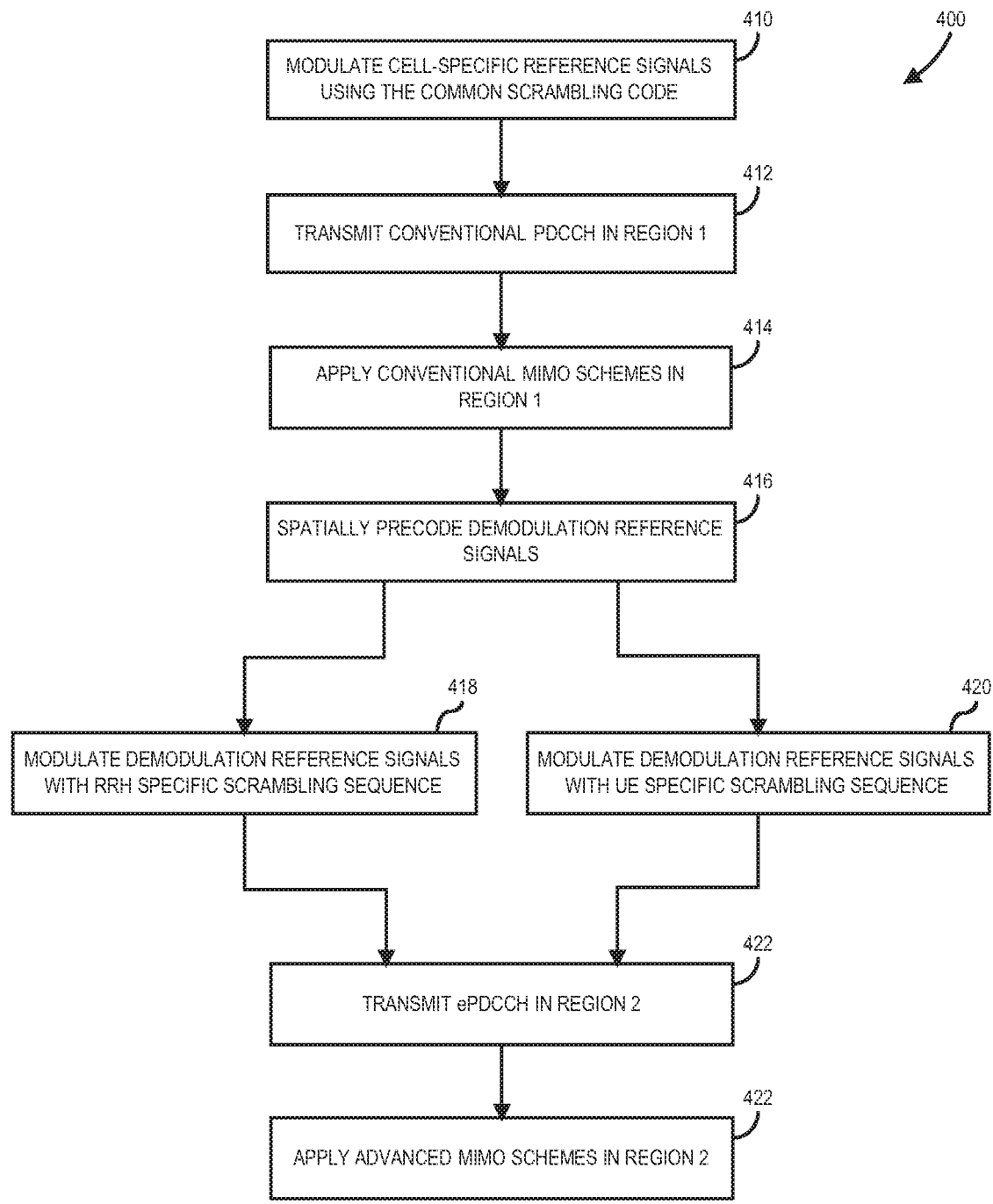
FIG. 4 is a flow diagram of a method to transmit an enhanced physical downlink control channel in accordance with one or more embodiments.

Referring now to FIG. 4, a flow diagram of a method to transmit an enhanced physical downlink control channel in accordance with one or more embodiments will be discussed. Method 400 illustrates one particular embodiment of a method to transmit a physical downlink control channel. However, in one or more alternative embodiments, various other orders of the blocks of method 400 may be implemented, with more or fewer blocks, and the scope of the claimed subject matter is not limited in this respect. As shown in FIG. 4, cell-specific reference signals may be modulated at block 410, and a conventional physical downlink control channel (PDCCH) may be transmitted at block 412 in a first region (Region 1) 310 of the enhanced downlink control channel structure 300 as shown in FIG. 3. Conventional multiple-input, multiple-output (MIMO) transmission schemes may be applied at block 414 in Region 1. In order to apply advanced MIMO schemes, demodulation reference signals may be spatially precoded at block 416. In one embodiment, the demodulation reference signals may be modulated at block 418 with a scrambling sequence specific to a particular remote radio head (RRH). In an alternative embodiment, the demodulation reference signals may be modulated at block 40 with a scrambling sequence specific to a particular user equipment (UE). In either embodiment, after modulation of the demodulation reference signals, an enhanced physical downlink control channel (ePDCCH) may be transmitted at block 422 in a second region (Region 2) 312 of the enhanced downlink control channel structure 300 as shown in FIG. 3. Advanced MIMO transmission schemes may then be applied at block 422 in Region 2.

Figure 5:
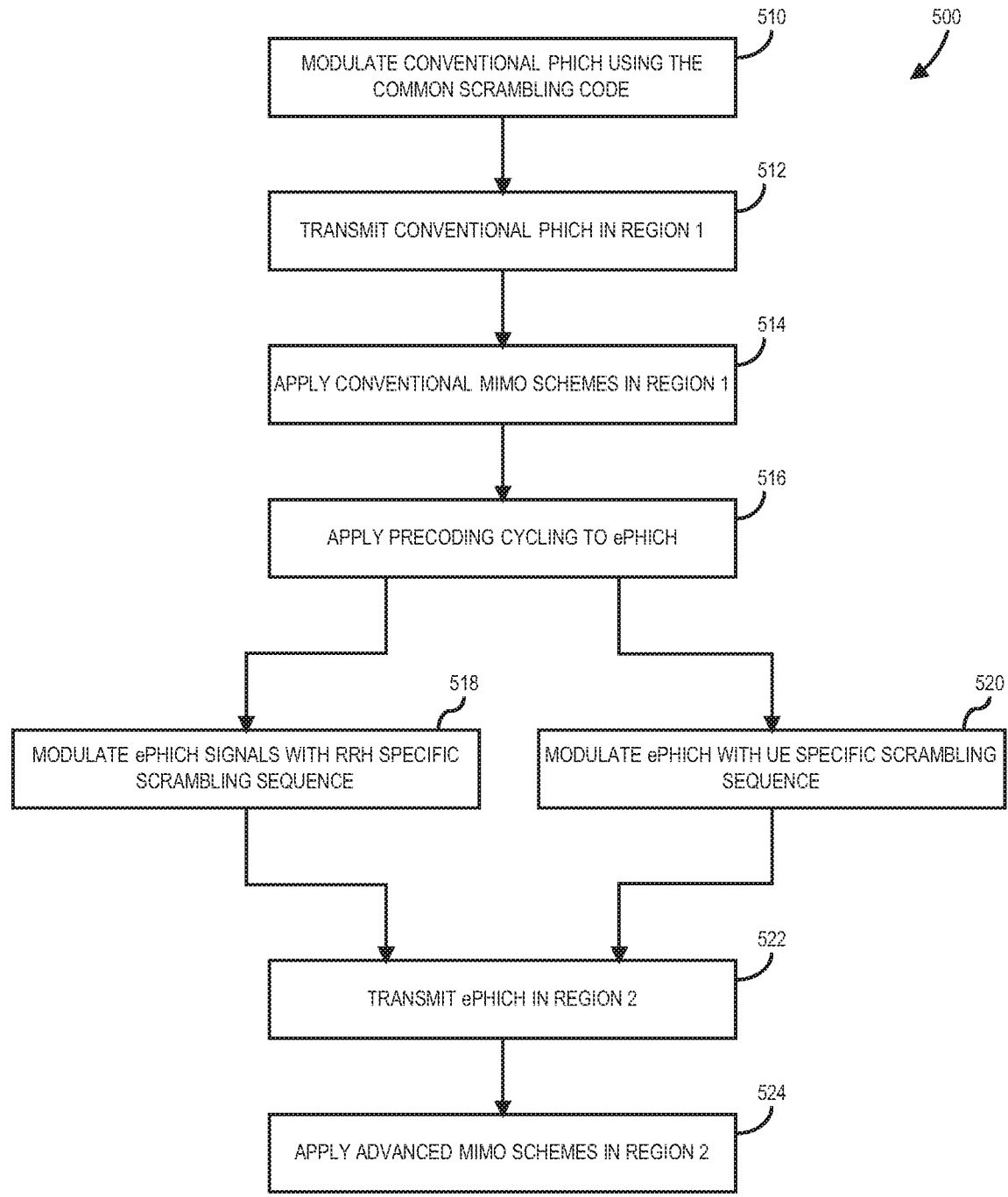
FIG. 5 is a flow diagram of a method to transmit an enhanced physical hybrid automatic repeat request indicator channel in accordance with one or more embodiments.

Referring now to FIG. 5, a flow diagram of a method to transmit an enhanced physical hybrid ARQ indicator channel in accordance with one or more embodiments will be discussed. Method 500 illustrates one particular embodiment of a method to transmit an enhanced physical hybrid ARQ indicator channel. However, in one or more alternative embodiments, various other orders of the blocks of method 500 may be implemented, with more or fewer blocks, and the scope of the claimed subject matter is not limited in this respect. As shown in FIG. 5, a conventional physical hybrid automatic repeat request (ARQ) indicator channel (PHICH) may be modulated at block 510 using a common scrambling code, and the conventional PHICH may then be transmitted in a first region (Region 1) 310 of the of the enhanced downlink control channel structure 300 as shown in FIG. 3. Convention multiple-input, multiple-output (MIMO) schemes may be applied at block 514 in Region 1 of the enhanced downlink control channel structure 300 as shown in FIG. 3. For an enhanced PHICH (ePHICH), precoding cycling may be applied at block 516 to the ePHICH for multiple antenna transmission. In one embodiment, the ePHICH signals may be modulated at block 518 with a scrambling sequence that is specific to a particular remote radio head (RRH). In an alternative embodiment, the ePHICH signals may be modulated at block 520 with a scrambling sequence that is specific to one or more particular user equipment (UE). In either embodiment, the ePHICH signals may be transmitted at block 522 in a second region (Region 2) 312 of the enhanced downlink control channel structure 300 as shown in FIG. 3. Advanced MIMO techniques may be applied at block 524 in Region 2.

Figure 6C:
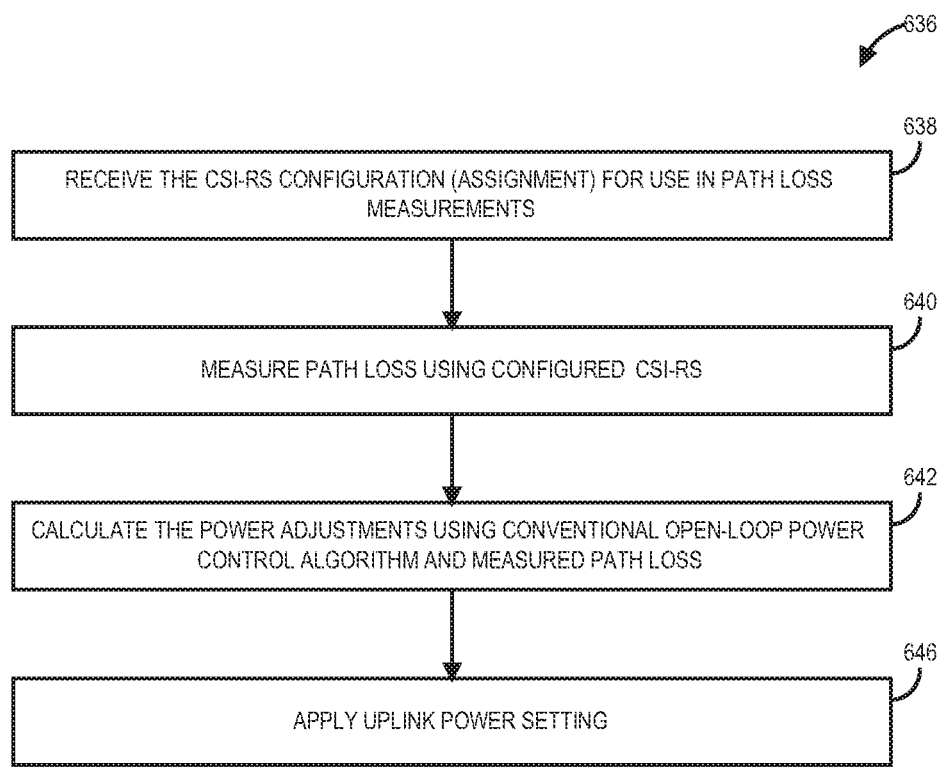

Referring now to FIG. 6A, FIG. 6B, and FIG. 6C, flow diagrams of methods to configure channel state information reference signals (CSI-RS) and uplink power control based on the CSI-RS configuration in accordance with one or more embodiments will be discussed. Method 600 and method 624 illustrate particular embodiments of methods to configure channel state information reference signals (CSI-RS), and method 636 illustrates a particular embodiment of a method to configure power control based on the CSI-RS configuration. However, in one or more alternative embodiments, various other orders of the blocks of method 600, method 624, and method 636 may be implemented, with more or fewer blocks, and the scope of the claimed subject matter is not limited in these respects. In one or more embodiments, several RRHs and/or eNB may receive sounding reference signals from the UE and send the measurements to the central control entity which selects the infrastructure nodes (RRHs and/or the eNB) with which a particular UE will operate. Since different infrastructure nodes have different CSI-RS configurations assigned to them, the infrastructure nodes may be the pre-selected as follows. The particular CSI-RS pattern that should be used for channel measurements and feedback report is configured by the central control unit for each UE independently.

FIG. 6A illustrates the CSI-RS configuration from the perspective of the network such as the central control entity which may be coupled to the enhanced Node B (eNB) of the wireless communication system. As shown in FIG. 6A, reference signals, for example sounding reference signals (SRS) may be received at block 610 from a particular user equipment (UE). Alternatively, at block 612, the central control entity configures one or more CSI-RSs for one or more remote radio heads (RRHs) and/or the eNB and transmits the CSI-RS configurations at block 614 to the UE via the one or more RRHs and/or the eNB. The central control entity then receives best CSI-RS index feedback from the UE at block 616. In any event, at block 618 the central control entity then determines one or more RRHs and/or the eNB to serve the UE, and then configures the CSI-RSs for the RRHs and/or the eNB at block 620. The UE may then be informed of the CSI-RS configuration at block 622.

FIG. 6B illustrates the CSI-RS configuration from the perspective of the UE. At block 626, the UE may send reference signals, for example sounding reference signals (SRS), to one or more RRHs and/or the eNB. Alternatively, the UE may receive a set of CSI-RSs from one or more RRHs and/or the eNB at block 628. The UE may then select at block 630 one or more CSI-RSs from the set of CSI-RSs. At block 632, the UE sends the best CSI-RS index as feedback to the central control entity. The UE then receives the CSI-RS configuration (assignment) from the central control entity at block 634.

FIG. 6C illustrates the power control procedure that may be practiced by the UE based on the CSI-RS configuration. At block 638, the CSI-RS configuration (assignment) is received by the UE for utilization in path loss measurements. The UE then measures or estimates the path loss at block 640 using the configured CSI-RS. The UE then calculates at block 642 power adjustments using conventional open-loop power control algorithm and the measured path loss. The UE is then able to apply an uplink power setting at block 646.

Referring now to FIG. 7, a block diagram of an information handling system capable of implementing a wireless communication system with a common cell identifier in a broadband network in accordance with one or more embodiments will be discussed. Information handling system 700 of FIG. 7 may tangibly embody one or more of any of the network elements or devices of the wireless communication system 100 as shown in and described with respect to FIG. 1. For example, information handling system 700 may represent the hardware of infrastructure node eNB 116, infrastructure node RRH 118, infrastructure node RRH 128, and/or, mobile station UE 124, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

In one or more embodiments, information handling system 700 may include an applications processor 710 and a baseband processor 712. Applications processor 710 may be utilized as a general purpose processor to run applications and the various subsystems for information handling system 700. Applications processor 710 may include a single core or alternatively may include multiple processing cores wherein one or more of the cores may comprise a digital signal processor or digital signal processing core. Furthermore, applications processor 710 may include a graphics processor or coprocessor disposed on the same chip, or alternatively a graphics processor coupled to applications processor 710 may comprise a separate, discrete graphics chip. Applications processor 710 may include on board memory such as cache memory, and further may be coupled to external memory devices such as synchronous dynamic random access memory (SDRAM) 714 for storing and/or executing applications during operation, and NAND flash 716 for storing applications and/or data even when information handling system 700 is powered off. Baseband processor 712 may control the broadband radio functions for information handling system 700. Baseband processor 712 may store code for controlling such broadband radio functions in a NOR flash 718. Baseband processor 712 controls a wireless wide area network (WWAN) transceiver 720 which is used for modulating and/or demodulating broadband network signals, for example for communicating via a 3GPP LTE network or the like as discussed herein with respect to FIG. 2. The WWAN transceiver 720 couples to one or more power amps 722 respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 and which may be capable of communicating via a Wi-Fi, Bluetooth, and/or an amplitude modulation (AM) or frequency modulation (FM) radio standard including an IEEE 802.11a/b/g/n standard or the like. It should be noted that these are merely example implementations for applications processor 710 and baseband processor 712, and the scope of the claimed subject matter is not limited in these respects. For example, any one or more of SDRAM 714, NAND flash 716 and/or NOR flash 718 may comprise other types of memory technology such as magnetic memory, chalcogenide memory, phase change memory, or ovonic memory, and the scope of the claimed subject matter is not limited in this respect.

In one or more embodiments, applications processor 710 may drive a display 730 for displaying various information or data, and may further receive touch input from a user via a touch screen 732 for example via a finger or a stylus. An ambient light sensor 734 may be utilized to detect an amount of ambient light in which information handling system 700 is operating, for example to control a brightness or contrast value for display 730 as a function of the intensity of ambient light detected by ambient light sensor 734. One or more cameras 736 may be utilized to capture images that are processed by applications processor 710 and/or at least temporarily stored in NAND flash 716. Furthermore, applications processor may couple to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Alternatively, controller 746 may comprise a Global Navigation Satellite System (GNSS) controller. Audio CODEC 744 may be coupled to one or more audio ports 750 to provide microphone input and speaker outputs either via internal devices and/or via external devices coupled to information handling system via the audio ports 750, for example via a headphone and microphone jack. In addition, applications processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory such as secure digital (SD) card or a subscriber identity module (SIM) card, although the scope of the claimed subject matter is not limited in these respects.

FIG. 8 is an isometric view of an information handling system of FIG. 7 that optionally may include a touch screen in accordance with one or more embodiments. FIG. 8 shows an example implementation of information handling system 700 of FIG. 7 tangibly embodied as a cellular telephone, smartphone, or tablet type device or the like. In one or more embodiments, the information handling system 700 may comprise any one of the infrastructure nodes and/or the mobile station UE 124 of FIG. 1, although the scope of the claimed subject matter is not limited in this respect. The information handling system 700 may comprise a housing 810 having a display 730 which may include a touch screen 732 for receiving tactile input control and commands via a finger 816 of a user and/or a via stylus 818 to control one or more applications processors 710. The housing 810 may house one or more components of information handling system 700, for example one or more applications processors 710, one or more of SDRAM 714, NAND flash 716, NOR flash 718, baseband processor 712, and/or WWAN transceiver 720. The information handling system 700 further may optionally include a physical actuator area 820 which may comprise a keyboard or buttons for controlling information handling system via one or more buttons or switches. The information handling system 700 may also include a memory port or slot 756 for receiving non-volatile memory such as flash memory, for example in the form of a secure digital (SD) card or a subscriber identity module (SIM) card. Optionally, the information handling system 700 may further include one or more speakers and/or microphones 824 and a connection port 754 for connecting the information handling system 700 to another electronic device, dock, display, battery charger, and so on. In addition, information handling system 700 may include a headphone or speaker jack 828 and one or more cameras 736 on one or more sides of the housing 810. It should be noted that the information handling system 700 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to an advanced wireless communication system with common cell ID and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An article of manufacture comprising a non-transitory storage medium having instructions stored thereon that, if executed, result in:

transmitting a physical downlink control channel (PDCCH) in a first region of a physical downlink control channel structure utilized by a remote radio head that has been assigned a cell identifier that is common to one or more other remote radio heads, or base station, or combinations thereof, within the cell;

wherein the PDCCH is modulated with a common scrambling code, and wherein the common scrambling code is common to multiple remote radio heads, or a base station, or combinations thereof, within the cell;

transmitting an enhanced physical downlink control channel (ePDCCH) in a second region of the physical downlink control channel structure;

wherein the ePDCCH is transmitted in a simultaneous transmission mode, and wherein one or more remote radio heads transmits its own control channel in the simultaneous transmission mode on resources common to the one or more remote radio heads using scrambling sequences specific to respective remote radio heads;

modulating demodulation reference signals with a specific scrambling sequence for said transmitting the enhanced physical downlink control channel;

spatially precoding the demodulation reference signals prior to said modulating; and spatially precoding the enhanced physical downlink channel;

wherein spatial precoding of demodulation reference signals is substantially similar to the spatial precoding of the enhanced physical downlink channel.

2. An article of manufacture as claimed in claim 1, wherein the specific scrambling code is specific to one or more remote radio heads, or a base station, or combinations thereof.

3. An article of manufacture as claimed in claim 1, wherein the specific scrambling code is specific to one or more user equipment.

4. An article of manufacture comprising a non-transitory storage medium having instructions stored thereon that, if executed, result in:
   transmitting a physical hybrid automatic repeat request indicator channel (PHICH) in a first region of a physical downlink control channel structure utilized by a remote radio head that has been assigned a cell identifier that is common to one or more other remote radio heads, or base station, or combinations thereof, within the cell;
   transmitting an enhanced physical hybrid automatic repeat request indicator channel (ePHICH) in a second region of the physical downlink control channel structure, wherein an ePDCCH is transmitted in the second region in a simultaneous transmission mode, and wherein one or more remote radio heads transmits its own control channel in the simultaneous transmission mode on resources common to the one or more remote radio heads using scrambling sequences specific to a respective remote radio heads;
   modulating the physical hybrid automatic repeat request indicator channel using a common scrambling code for said transmitting a physical hybrid automatic repeat request indicator channel; and
   modulating enhanced physical hybrid automatic repeat request indicator channel signals with a specific scrambling sequence for said transmitting the enhanced physical downlink control channel.

5. An article of manufacture as claimed in claim 4, wherein the common scrambling code is common to multiple remote radio heads, or a base station, or combinations thereof, within the cell.

6. An article of manufacture as claimed in claim 4, wherein the specific scrambling sequence is specific to a particular remote radio head.

7. An article of manufacture as claimed in claim 4, wherein the specific scrambling sequence is specific to a particular user equipment.

8. An information handling system, comprising:
   a baseband processor coupled to one or more wireless transceivers, wherein the baseband processor is configured to:
   receive a physical downlink control channel (PDCCH) in a first region of a physical downlink control channel structure utilized by a remote radio head that has been assigned a cell identifier that is common to one or more other remote radio heads within the cell;
   wherein the PDCCH is modulated with a common scrambling code, and wherein the common scrambling code is common to multiple remote radio heads, or a base station, or combinations thereof, within the cell; and
   receive an enhanced physical downlink control channel (ePDCCH) in a second region of the physical downlink control channel structure;
   wherein the ePDCCH is received in a simultaneous transmission mode, and wherein one or more remote radio heads transmits its own control channel in the simultaneous transmission mode on resources common to the one or more remote radio heads using scrambling sequences specific to a respective remote radio heads;
   demodulate the physical downlink control channel with a common scrambling code used for transmitting the physical downlink control channel;
   demodulate demodulation reference signals with a specific scrambling sequence used for transmitting the demodulation reference signals; and
   spatially decode the demodulation reference signals.

9. An information handling system as claimed in claim 8, wherein the common scrambling code is common to multiple remote radio heads, or a base station, or combinations thereof, within the cell.

10. An information handling system as claimed in claim 8, wherein the specific scrambling code is specific to a one or more particular remote radio heads, or a base station, or combinations thereof.

11. An information handling system as claimed in claim 8, wherein the specific scrambling code is specific to one or more particular user equipment.

12. An information handling system as claimed in claim 8, further comprising an applications processor coupled to the baseband processor, and a touch screen to receive an input to control the applications processor.

* * * * *